Aug. 8, 1967  R. L. TRILLO  3,334,699
GAS-CUSHION SUPPORTED VEHICLES WITH DRAG INHIBITING MEANS
Filed Dec. 8, 1964  3 Sheets-Sheet 3
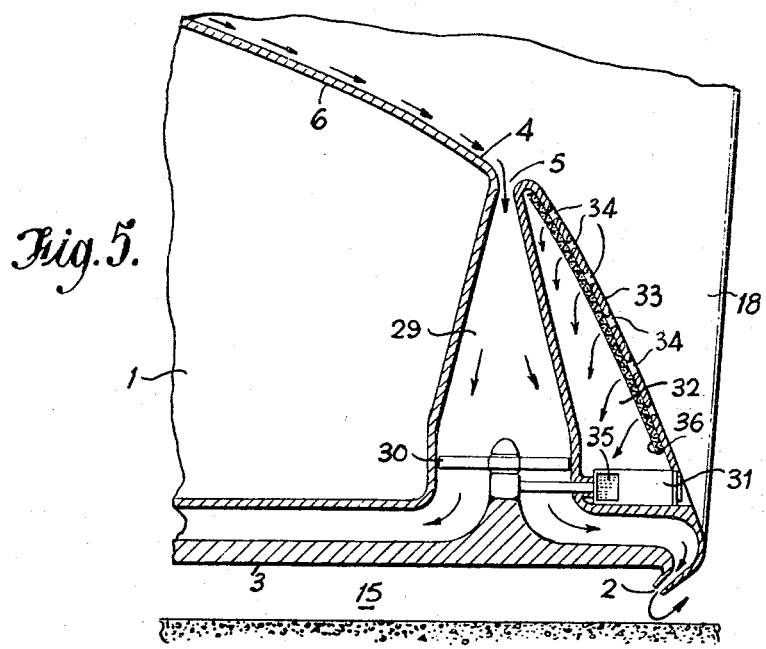
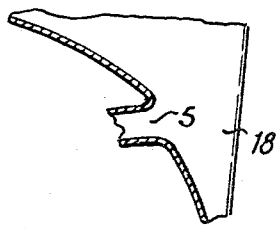 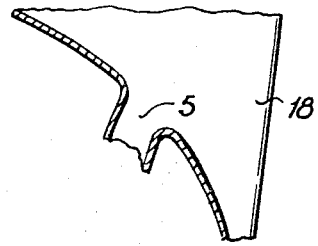
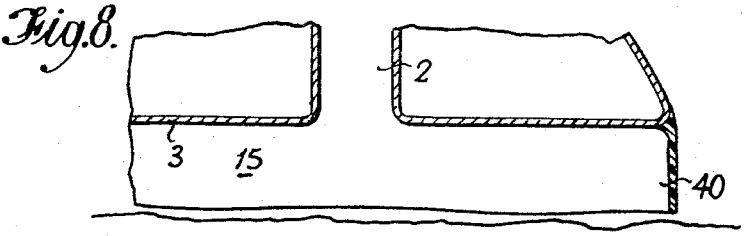
INVENTOR
R. L. TRILLO
BY
Cameron, Kerkam & Sutton
ATTORNEYS United States Patent Office
3,334,699
Patented Aug. 8, 1967

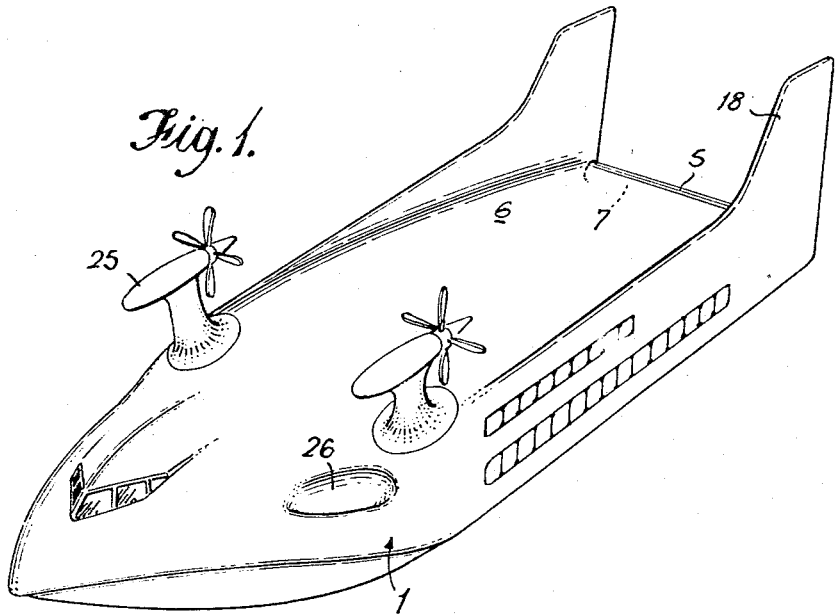
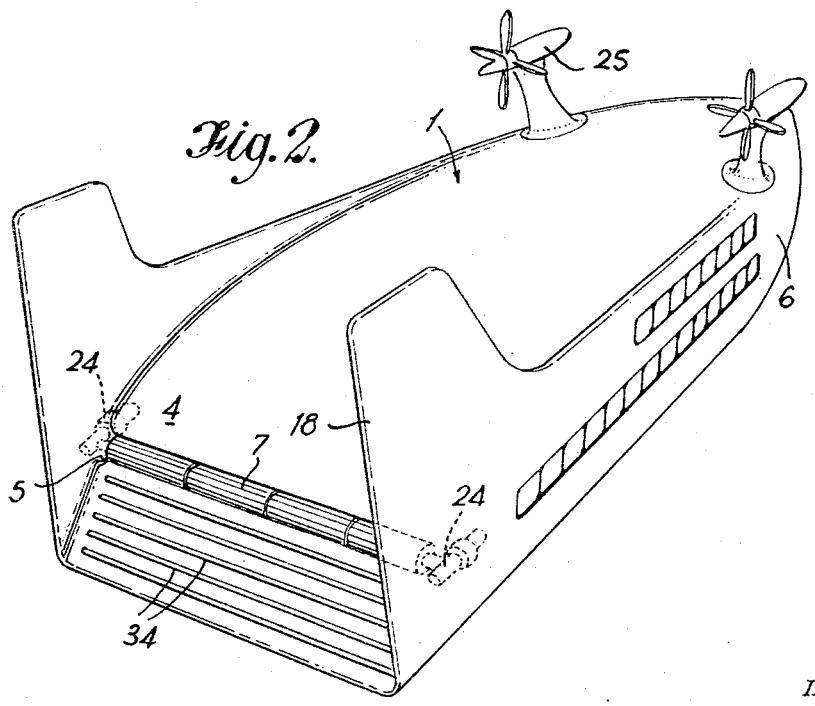

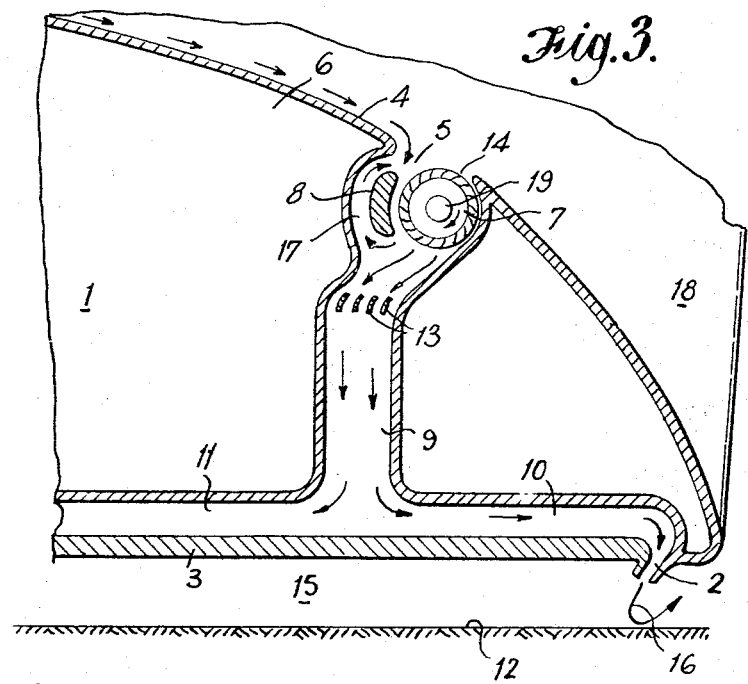
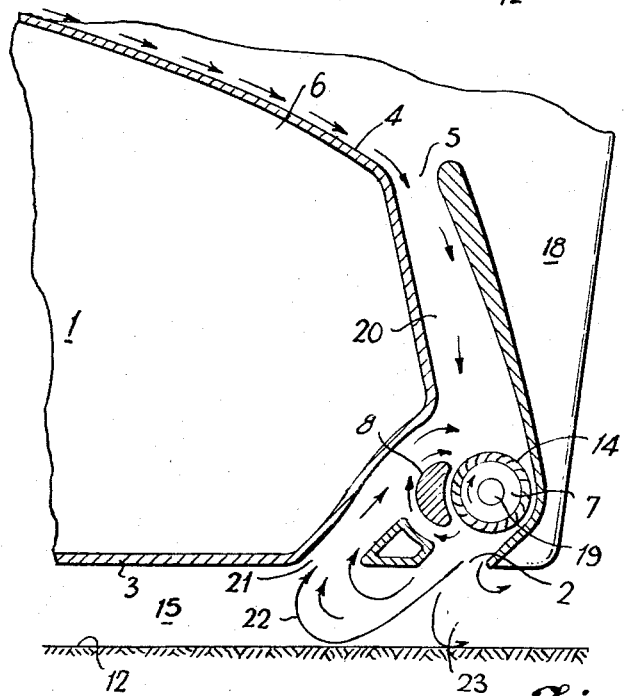

3,334,699
GAS-CUSHION SUPPORTED VEHICLES WITH
DRAG INHIBITING MEANS
Robert Longley Trillo, Dibden Purlieu, Southampton,
England, assignor to Hovercraft Development Limited,
London, England, a British company
Filed Dec. 8, 1964, Ser. No. 416,729
Claims priority, application Great Britain, Dec. 11, 1963,
49,004/63
16 Claims. (Cl. 180—7)

This invention relates to gas-cushion supported vehicles, that is to say vehicles for travelling over a surface and which, in operation, are supported above that surface at least in part by a cushion of pressurised gas (usually air) formed and contained beneath the vehicle. A vehicle-supporting cushion may be contained for at least part of its periphery by a curtain of moving fluid (usually air).

Such vehicles can travel at speeds which introduce drag penalties resulting from the formation of a boundary layer of air on the surface of the vehicle body. The boundary layer of air subsequently breaks away from the body at or near its rear to create a so-called "separation" drag. This drag becomes even more pronounced at speeds where it is desirable to give a gas-cushion vehicle aerodynamic lift by providing it with an aerofoil-shaped body.

In aircraft, control of separation drag requires the taking in of quite large quantities of boundary layer air from the upper surfaces of wings with the requirement of large amounts of power to drive pumps for taking in the air. This air is usually far in excess of any requirement of the aircraft and as it is usually available only at a position where it cannot be used with reasonable efficiency the air is subsequently allowed to escape into the surrounding atmosphere. The power requirement for drawing in these large quantities of air is of the same order as the propulsive power saved by taking in of boundary layer air and so, in general, little advantage is obtained.

However, gas-cushion vehicles of the aforementioned kind require fairly large flows of air for forming the cushion and/or cushion-containing curtains. Collecting the boundary layer air for these purposes suggests a saving in power requirements in that the air drawn in to reduce drag can be so used and this avoids the need to provide a further power source to supply this need.

Hence, according to the invention a gas-cushion supported vehicle comprises a vehicle body, an air supply port formed in the lower part of the vehicle body, a boundary layer air intake formed in the upper surface of the vehicle body and extending substantially normal to the fore and aft axis thereof, duct means interconnecting said intake and said supply port, and air energising means distributed within said duct means along a line substantially normal to said fore and aft axis whereby boundary layer air drawn in through said intake is discharged from the supply port.

Air discharged from the supply port may form a cushion-containing curtain. Alternatively, it may form the cushion itself, or it may help to form both a cushion and a curtain.

Preferably the air energising means comprise a tangential or cross-flow air pump having an axis of rotation substantially normal to said fore and aft axis.

The invention will be readily understood by the following description of certain embodiments in conjunction with the accompanying drawings in which:

FIGURES 1 and 2 are front and rear views, in perspective, of one embodiment of a gas-cushion vehicle, FIGURE 3 is a vertical cross-section of the rear part of the vehicle of FIGURES 1 and 2, normal to the fore and aft axis of the vehicle, FIGURE 4 is a similar cross-section to that of FIGURE 3 illustrating a further embodiment, FIGURE 5 is a further cross-section similar to that of FIGURE 3 illustrating another embodiment, FIGURES 6 and 7 illustrate modifications of the three embodiments, and FIGURE 8 illustrates a further modification of the three embodiments and modifications thereof.

With reference to FIGURES 1 to 3, a gas (air) cushion vehicle 1 has the rearmost portion of the periphery of its supporting cushion 15 contained by a curtain 16 of moving air issuing from a supply port 2 formed in the bottom 3 of the rear part of the vehicle body 6 and extending across the body in a direction normal to the fore and aft axis thereof. The air for the curtain 16 is boundary layer air drawn in from the top surface 4 of the vehicle body 6, by way of an intake 5 extending across the rear part of the top surface 4, in a direction normal to the fore and aft axis of the vehicle body, i.e. parallel to the supply port 2. An inner portion of the air curtain 16 "feeds" the cushion 15. Air energising means in the form of a tangential or cross-flow pump 7 is distributed across the vehicle body 6 in a direction parallel to the intake 5. The intake 5 forms the inlet of the pump 7. The outlet of the pump 7 is connected to the supply port 2 by way of an angled duct 9 and a branch duct 10. The pump 7 rotates about a substantially horizontal axis 19.

The pump 7 has vanes 14 and alongside the pump 7 is disposed an elongate guide body or baffle structure 8 extending parallel to the axis of pump 7 and spaced from adjacent wall parts of the duct 9 to define a recirculatory passage 17 therewith. Guide vanes 13 are disposed in the duct 9 downstream of the pump 7 and extend parallel to the pump. The vanes 13 guide the air from the angled portion of the duct 9, to the vertical portion thereof.

The vehicle body 6 has a section (viewed horizontally in a direction normal to the fore and aft axis of the vehicle body), which is substantially that of an aerofoil. The pump 7 is driven by gas-turbines 24. The vehicle 1 is propelled by gas-turbine propulsion units 25 which draw in combustion air through intakes 26. The units 25 can swivel about the vehicle body to vary their directions of thrust.

In operation, boundary layer air is sucked into the pump 7, by way of the intake 5, is energised, and then discharged into the duct 9 where part flows through the branch duct 10 to the supply port 2 to form the curtain 16 and the remainder flows through a branch duct 11 to further ports (similar to the supply port 2) to form further curtains which can be used to contain (or, in combination with structural members such as flexible "skirts" or walls, to assist in containing) the periphery of the cushion 15. Alternatively, the further curtains can be used for dividing the cushion 15 formed between the bottom 3 of the vehicle body and the surface 12 above which the vehicle is supported for stability or other purposes. If the intake of boundary layer air is insufficient to form the above mentioned "further" curtains, the latter curtains can be formed by atmospheric air, other than boundary layer air, drawn in and compressed by further air pumps.

The drawn-in boundary air is energised in passage across the pump, by work done on it by the pump vanes 14. Part of the air flow across the pump 7 sets up a vortex and this is employed to induce a recirculatory flow of air through the passage 17 between the forward wall of duct 9 and the baffle structure 8.

It will be seen that the arrangement causes little deflection of air flow. Air drawn in through the intake 5 is deflected by the pump 7 as it passes through the pump and requires only slight deflection by the guide vanes 13 to flow downwardly through the duct 9. If the whole of the air flowing through the duct 9 is to be fed to the supply port 2, it is possible to make the duct 9 angle-free and further reduce the deflection of the air. Substantially no sideways deflection of the air occurs. Thus the air is taken in over substantially the same spanwise distance as it is to be ejected to form the curtain and is energized by means extending over this same distance. A simple, convenient, and efficient system is provided.

To improve the flow characteristics into the inlet of the pump 7, the vehicle 1 is provided with upright-disposed side plates 18 extending upwards from the top surface 4 of the body 6, giving two dimensional flow into the intake 5. During operation of the vehicle 1, a negative pressure will exist over the upper surface 4, and the side plates 18 extend towards the front of the vehicle 1 to restrict the upward flow of air round the sides of the vehicle body 6 on to the top surface 4, so as to maintain the negative pressure as far as possible. The engines 24 are housed within the side plates 18.

FIGURE 4 shows an alternative arrangement in which the pump 7 is positioned near the bottom of the vehicle body 6. Boundary layer air is drawn in through the intake 5 and is fed through a duct 20 to the pump 7. From the pump 7 the air, now energized, is fed directly to the supply port 2. Formed in the bottom surface 3, spaced inboard a short distance from the supply port 2 and extending parallel thereto, is a recovery port 21. Part of the air flow issuing from the supply port 2 flows inwards towards the cushion 15 and is then deflected round and upwards by cushion pressure to flow back to the pump 7 by way of the recovery port 21, and in the form of a curtain 22. The remainder of the air flow, a flow substantially equal to the flow through the duct 20, flows outwards to form a curtain 23. There is thus formed a duplex air curtain system.

FIGURE 5 illustrates an embodiment with an alternative form of air energizing means comprising a series of axial flow fans or pumps 30 having substantially upright rotational axes. The pumps 30 are distributed in a row across the width of the vehicle in a direction substantially normal to the fore and aft axis of the vehicle body 6. The flow of air from the intake 5 to the supply port 2 is by way of a duct 29 and is substantially linear. Depending upon the form of pumps 30 some residual rotational component of motion of the air may remain but the majority of the advantages of the straight through flow illustrated in FIGURES 3 and 4 will remain. Centrifugal fans or pumps can be provided instead of axial flow fans, the rotational axes of the former being vertical or horizontal, or at some intermediate angle.

FIGURE 5 also illustrates an arrangement in which the formation of residual eddies in the air flow immediately behind the rear part of the body can be reduced or impeded. The pumps 30 are driven, through gearing, by horizontally disposed internal combustion engines 31 positioned in a plenum chamber 32 at the rear of the vehicle. The rear wall 33 of the plenum chamber forms the rear wall of the vehicle. Formed in the rear wall 33 are slots defining inlets 34 to a knit-mesh air filter 36 housed in the chamber 32. The air intakes 35 of the engines 31 are open to the plenum chamber 32 and air is drawn through the inlets 34 and filter 36 to within the plenum chamber 32 from whence it flows to the engine intakes 35. The drawing of air in through the inlets 34 reduces the formation of residual eddies behind the vehicle with a resulting reduction in drag. This arrangement of inlets and plenum chamber can also be provided for the embodiments illustrated in FIGURES 3 and 4.

Although the intake 5 has been shown as facing vertically upwards, the position of the intake can vary. For example, the intake 5 can be positioned so that it faces completely backwards (FIGURE 6) or can be inclined so as to face in a direction having a rearward component (FIGURE 7). Such rearward facing of the intake 5 can reduce the possibility of foreign matter (such as water spray) being drawn into the intake.

The above-described embodiments and modifications thereof have the common feature that the collected boundary air is used to form a cushion-containing curtain. In a modification of any of the above described examples the collected air may also be used to form and maintain the vehicle-supporting cushion 15 itself. With reference to FIGURE 8 the port 2 can be arranged to feed air directly to the space occupied by the cushion 15, air for the cushion-containing curtains being supplied from a source other than boundary layer air. Alternatively, and as illustrated, the cushion 15 can be contained by a flexible wall or skirt 40.

The invention provides a "direct" supply of air from the intake 5 to supply duct 2 and does not require a plenum chamber therebetween. A plenum chamber takes up space and increases height, which in turn increases drag.

I claim:

1. A gas-cushion supported vehicle which, in operation, is supported above a surface at least in part by a cushion of pressurised gas formed and contained in a space beneath the vehicle comprising a vehicle body, an air supply port formed in the lower rear part of the vehicle body and extending across the body substantially normal to the fore and aft axis thereof so that air discharged therefrom forms a curtain to contain at least part of the rearmost portion of the cushion periphery, a boundary layer air intake formed in the upper surface of the vehicle body and extending across said surface substantially parallel to said supply port, duct means interconnecting said intake and said supply port, and air energising means disposed within said duct means and extending along a line substantially normal to said fore and aft axis, said air intake, supply port and energising means extending over substantially the same spanwise distance, whereby boundary layer air drawn in through said intake is delivered to and discharged from the supply port with substantially no sideways deflection of the air.

2. A gas-cushion supported vehicle as claimed in claim 1 wherein said air energising means comprise a tangential flow air pump disposed within said duct means with its axis of rotation extending substantially horizontally normal to said fore and aft axis.

3. A vehicle as claimed in claim 2 including means for inducing a recirculatory air flow through the pump.

4. A vehicle as claimed in claim 3 wherein said means for inducing a recirculatory air flow comprise an air flow baffle structure disposed alongside the pump and spaced from adjacent wall parts of said duct means to define a recirculatory passage therewith.

5. A vehicle as claimed in claim 2 wherein said pump is sited so that as it rotates the uppermost parts are disposed substantially within the opening of said intake.

6. A vehicle as claimed in claim 1 wherein said air energising means comprise a series of rotary pumps disposed in a row extending substantially normal to the fore and aft axis of the vehicle body, with their axes of rotation substantially upright.

7. A vehicle as claimed in claim 1 wherein said air energising means comprise a series of centrifugal pumps disposed in a row extending substantially normal to the fore and aft axis of the vehicle body, with their axes of rotation substantially upright.

8. A vehicle as claimed in claim 1 including air-suction means for drawing in air from behind the rear end of the vehicle body so as to reduce the formation of drag-inducing eddies.

9. A vehicle as claimed in claim 8 including an internal combustion engine having a combustion air intake, and wherein said air-suction means include the combustion air intake of said internal combustion engine.

10. A vehicle as claimed in claim 9 wherein the internal combustion engine is arranged to drive the air energising means.

11. A vehicle as claimed in claim 1 including means for restricting the flow of air from around the sides of the vehicle body to the top thereof.

12. A vehicle as claimed in claim 11 wherein said air flow restricting means include side plates disposed substantially upright at the sides of the vehicle body.

13. A vehicle as claimed in claim 1 wherein the vehicle body has a cross-section, viewed horizontally in a direction normal to the fore and aft axis of the vehicle, which is substantially that of an aerofoil.

14. A vehicle as claimed in claim 2 including means for recovering into the vehicle at least part of the air forming said curtain and employing said recovered air for further use of the energy therein.

15. A vehicle as claimed in claim 14 wherein said air recovering means include a recovery port spaced from and disposed parallel to said air supply port, and duct means connecting the recovery port with the inlet side of said air pump.

16. A vehicle as claimed in claim 1 wherein said boundary layer air intake is disposed so as to face rearwards of the vehicle.

References Cited

UNITED STATES PATENTS

| | | | |
|---|---|---|---|
| 3,117,645 | 1/1964 | Cockerell | 180—7 |
| 3,172,495 | 3/1965 | Bliss et al. | 180—7 |
| 3,185,239 | 5/1965 | Cockerell | 180—7 |
| 3,193,215 | 7/1965 | Dunham | 180—7 |
| 3,207,113 | 9/1965 | Tatersall | 180—7 |

A. HARRY LEVY, *Primary Examiner.*